(No Model.)

D. T. BRYAN.
LARD AND BUTTER CUTTER.

No. 265,380. Patented Oct. 3, 1882.

Witnesses.
Robt. Johnston
W. H. Kern

Inventor.
D. T. Bryan,
per
F. A. Lehmann,
Atty.

United States Patent Office.

DEMPSEY T. BRYAN, OF ROCKY MOUNT, NORTH CAROLINA.

LARD AND BUTTER CUTTER.

SPECIFICATION forming part of Letters Patent No. 265,380, dated October 3, 1882.

Application filed July 24, 1882. (No model.)

*To all whom it may concern:*

Be it known that I, D. T. BRYAN, of Rocky Mount, in the county of Nash and State of North Carolina, have invented certain new and useful Improvements in Lard and Butter Cutters; and I do hereby declare the following to be a full, clear, and exact description of the invention, such as will enable others skilled in the art to which it pertains to make and use it, reference being had to the accompanying drawings, which form part of this specification.

My invention relates to an improvement in lard, butter, and cheese cutters.

It consists in the combination of two cylinders, one of which is placed inside of the other, and which can be turned independently of each other, with a graduated handle which forces the butter, lard, or cheese from the inner cylinder, and which handle indicates the weight or quantity as the lard or butter is forced from the cylinder, as will be more fully described hereinafter.

Figure 1:
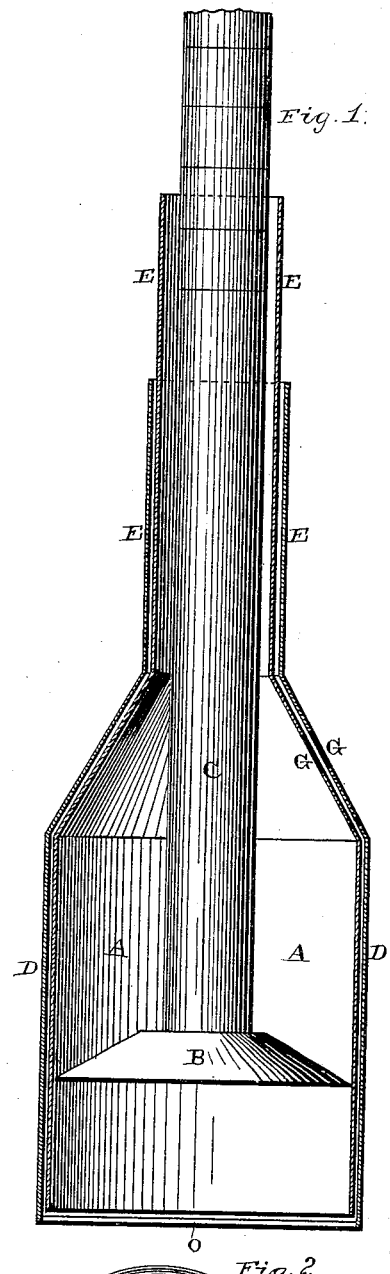
Figure 2:
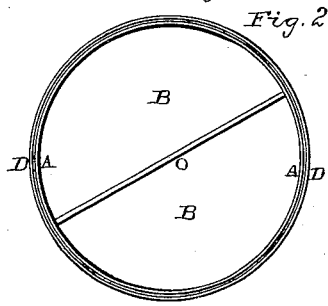

Figure 1 is a vertical section of a cutter embodying my invention. Fig. 2 is an end view of the same.

A represents the inner cylinder, in which the plunger B on the handle C moves, and D the outer cylinder, which fits snugly upon the inner one, A. Each of these cylinders is provided with a handle, E, which extends up along the handle any suitable distance, the handle of the inner cylinder being made the longest and made to project beyond the upper end of the handle of the outer cylinder, so that it can be grasped and the cylinder moved independently of the others. These handles will preferably be made corrugated or roughened in any suitable manner, so that they will not readily slip from the end. Secured to the lower end of the outer cylinder is the wire O, which cuts the butter, lard, or cheese both in the barrel when the inner cylinder has been filled and when the lard, butter, or cheese is being forced outward by the piston. The handle is graduated so as to indicate the quantity or weight when the piston is forced downward so as to force the butter, lard, or cheese from the cylinder, in contradistinction to indicating the amount when the cylinder is being filled. Each one of the cylinders has a vent-hole, G, made through its upper end, so that when the two cylinders are turned in such a manner that these openings register the lard or butter which has accumulated behind the piston can be readily forced out.

The operation of my machine is as follows: The handle of the outside cylinder is grasped by the hand, and then the two cylinders are pushed down in the butter or lard until the cylinder is full. The outer cylinder is then turned independently of the inner one, so that the wire upon its lower end will cut the butter or lard, and thus sever the quantity in the cylinder from that which is in the barrel, keg, or case. The implement, filled with lard or butter, is then held over the vessel to receive its contents, and the handle is pushed inward until the marks upon it indicate the desired quantity which is to be forced out. The outer cylinder is then revolved, so that the wire will cut off all of that portion which has been forced out of the cylinders, and this portion drops into the vessel.

By means of this construction various quantities can be served to different persons at the same time without having to again fill the cylinder from the barrel or tub. Where but a single cylinder is used the whole of the contents must be discharged at once, because there is no means attached to the implement for cutting off the quantity which has been forced by the piston beyond its lower end. The wire across the end of the outside cylinder also serves to keep the inner cylinder in position.

If preferred, the outside cylinder may be removed and the wire across its bottom adjusted across the end of the inside cylinder, which can then be used without the outer cylinder, as the consistency of the lard may require. By this means both cylinders may be used at once, or separately, as may be required.

Having thus described my invention, I claim—

The combination of a graduated handle having a piston on its lower end with the two concentric cylinders which move independently of each other, the outer cylinder being provided with a wire across its lower end, substantially as described.

In testimony whereof I affix my signature in presence of two witnesses.

DEMPSEY T. BRYAN.

Witnesses:
T. J. REAMY,
A. ABRAM.